US011423545B2

(12) United States Patent
Kim et al.

(10) Patent No.: US 11,423,545 B2
(45) Date of Patent: Aug. 23, 2022

(54) IMAGE PROCESSING APPARATUS AND MOBILE ROBOT INCLUDING SAME

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Beomseong Kim, Seoul (KR); Yeonsoo Kim, Seoul (KR); Dongki Noh, Seoul (KR); Euntai Kim, Seoul (KR); Jisu Kim, Seoul (KR); Sangyun Lee, Seoul (KR)

(73) Assignees: LG ELECTRONICS INC., Seoul (KR); INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 48 days.

(21) Appl. No.: 16/770,066

(22) PCT Filed: Dec. 4, 2018

(86) PCT No.: PCT/KR2018/015255
§ 371 (c)(1),
(2) Date: Jun. 4, 2020

(87) PCT Pub. No.: WO2019/112296
PCT Pub. Date: Jun. 13, 2019

(65) Prior Publication Data
US 2020/0394801 A1 Dec. 17, 2020

(30) Foreign Application Priority Data
Dec. 5, 2017 (KR) .................. 10-2017-0165887

(51) Int. Cl.
*G06K 9/00* (2022.01)
*G06T 7/11* (2017.01)
(Continued)

(52) U.S. Cl.
CPC .............. *G06T 7/11* (2017.01); *G05D 1/0251* (2013.01); *G06V 20/10* (2022.01);
(Continued)

(58) Field of Classification Search
CPC .............. G06T 7/11; G06T 2207/10024; G06T 2207/10028; G06T 2207/20081; G06T 2207/30261; G05D 1/0251; G06K 9/00664
(Continued)

(56) References Cited

PUBLICATIONS

He, Shengfeng, et al. "Supercnn: A superpixelwise convolutional neural network for salient object detection." International journal of computer vision 115.3 (2015): 330-344. (Year: 2015).*

(Continued)

*Primary Examiner* — Jonathan S Lee
(74) *Attorney, Agent, or Firm* — Lee Hong Degerman Kang Waimey

(57) ABSTRACT

The present invention relates to an image processing apparatus and a mobile robot including the same. The image processing apparatus according to an embodiment of the present invention includes an image acquisition unit for obtaining an image and a processor for performing signal processing on the image from the image acquisition unit, and the processor is configured to group super pixels in the image on the basis of colors or luminances of the image, calculate representative values of the super pixels and perform segmentation on the basis of the representative values of the super pixels. Accordingly, image segmentation can be performed rapidly and accurately.

16 Claims, 24 Drawing Sheets

(51) Int. Cl.
  *G05D 1/02* (2020.01)
  *G06V 20/10* (2022.01)
(52) U.S. Cl.
  CPC ............... *G06T 2207/10024* (2013.01); *G06T 2207/10028* (2013.01); *G06T 2207/20081* (2013.01); *G06T 2207/30261* (2013.01)
(58) Field of Classification Search
  USPC ........................................................ 382/153
  See application file for complete search history.

(56) References Cited

PUBLICATIONS

Kaneko, Naoshi, Takeshi Yoshida, and Kazuhiko Sumi. "Fast obstacle detection for monocular autonomous mobile robots." SICE Journal of Control, Measurement, and System Integration 10.5 (2017): 370-377. (Year: 2017).*
Gupta, Saurabh, et al. "Indoor scene understanding with rgb-d images: Bottom-up segmentation, object detection and semantic segmentation." International Journal of Computer Vision 112.2 (2015): 133-149. (Year: 2015).*
Siva, Parthipan, and Alexander Wong. "Grid seams: A fast superpixel algorithm for real-time applications." 2014 Canadian Conference on Computer and Robot Vision. IEEE, 2014. (Year: 2014).*
Zhang, Pingping, et al. "Learning uncertain convolutional features for accurate saliency detection." Proceedings of the IEEE International Conference on computer vision. 2017. (Year: 2017).*
Wang, Rui, Rui Li, and Haiyan Sun. "Haze removal based on multiple scattering model with superpixel algorithm." Signal Processing 127 (2016): 24-36. (Year: 2016).*
Benesova, Wanda, and Michal Kottman. "Fast superpixel segmentation using morphological processing." Conference on Machine Vision and Machine Learning. 2014. (Year: 2014).*
Korean Intellectual Property Office Application No. 10-2017-0165887, Office Action dated Jun. 23, 2022, 7 pages.
Kaneko et al., "Fast Obstacle Detection for Monocular Autonomous Mobile Robots", SICE Journal of Control, Measurement, and System Integration, vol. 10, No. 5, Sep. 2017, 9 pages.

* cited by examiner

IMAGE PROCESSING APPARATUS AND MOBILE ROBOT INCLUDING SAME

CROSS-REFERENCE TO RELATED APPLICATIONS

This application is the National Stage filing under 35 U.S.C. 371 of International Application No. PCT/KR2018/015255, filed on Dec. 4, 2018, which claims the benefit of earlier filing date and right of priority to Korean Application No. 10-2017-0165887, filed on Dec. 5, 2017, the contents of which are all hereby incorporated by reference herein in their entirety.

TECHNICAL FIELD

The present invention relates to an image processing apparatus and a mobile robot including the same, and more specifically, to an image processing apparatus which can rapidly and accurately perform segmentation of an image and a mobile robot including the same.

BACKGROUND ART

In public places such as airports, train stations, ports, department stores and auditoriums, information is provided to users through electronic display boards, information signs, and the like. However, electronic display boards, information signs, and the like unilaterally deliver only some information selected by service providers and have a problem that they cannot cope with requirements of individual users.

Meanwhile, robots have been developed for industrial purposes and served as a part of factory automation. With recent extension of applications using robots, medical robots, aerospace robots and the like have been developed and home robots that can be used in many households are also manufactured.

Accordingly, research on methods for providing various services using robots in public places is increasingly conducted.

To provide various services, it is desirable that robots be movable.

For movement of robots, signal processing of acquired images needs to be performed and robots need to travel while avoiding obstacles. Accordingly, various methods based on images for improving travel performance are researched.

DISCLOSURE

Technical Problem

An object of the present invention is to provide an image processing apparatus which can rapidly and accurately perform segmentation of an image and a mobile robot including the same.

Technical Solution

In accordance with an aspect of the present invention, the above and other objects can be accomplished by the provision of an image processing apparatus including: an image acquisition unit for obtaining an image; and a processor for performing signal processing on the image from the image acquisition unit, wherein the processor is configured to: group super pixels in the image on the basis of colors or luminances of the image; calculate representative values of the super pixels; and perform segmentation on the basis of the representative values of the super pixels.

In accordance with an aspect of the present invention, the above and other objects can be accomplished by the provision of a mobile robot including: a main body; a driving unit for moving the main body; an image acquisition unit for obtaining an image; and a processor for performing signal processing on the image from the image acquisition unit, wherein the processor is configured to: group super pixels in the image on the basis of colors or luminances of the image; calculate representative values of the super pixels; and perform segmentation on the basis of the representative values of the super pixels.

Advantageous Effects

An image processing apparatus according to an embodiment of the present invention includes: an image acquisition unit for obtaining an image; and a processor for performing signal processing on the image from the image acquisition unit, and the processor groups super pixels in the image on the basis of colors or luminances of the image, calculates representative values of the super pixels, and performs segmentation on the basis of the representative values of the super pixels, to thereby perform segmentation of the image rapidly and accurately.

Particularly, the performance of a mobile robot including the image processing apparatus can be improved by extracting an area in which the mobile robot can move through segmentation.

Meanwhile, it is possible to accurately perform image segmentation by controlling the segmentation such that it is performed for a plurality of channels.

Further, it is possible to allocate weights to the plurality of channels and distinguishes regions in the image on the basis of the allocated weights and level values of the plurality of channels, and thus image segmentation can be accurately performed.

Meanwhile, a pattern in an image is not distinguished when the pattern is smaller than the sizes of super pixels and the pattern is distinguished when the pattern is larger than the sizes of the super pixels, and thus unnecessary calculation can be reduced.

A mobile robot according to an embodiment of the present invention to accomplish the object includes: a main body; a driving unit for moving the main body; an image acquisition unit for obtaining an image; and a processor for performing signal processing on the image from the image acquisition unit, and the processor groups super pixels in the image on the basis of colors or luminances of the image, calculates representative values of the super pixels and performs segmentation on the basis of the representative values of the super pixels, to thereby perform segmentation of the image rapidly and accurately.

Further, a pattern in an image is not distinguished and a main body is controlled to move to the pattern when the pattern is smaller than the sizes of super pixels, whereas the pattern is distinguished and the main body is controlled not to move to the pattern when the pattern is larger than the sizes of the super pixels, and thus unnecessary calculation can be reduced.

BEST MODE

Hereinafter, the present invention will be described in more detail with reference to the drawings.

The suffixes "module" and "unit" of elements used in the following description are used for convenience of description and do not have any distinguishable meanings or functions. Accordingly, "module" and "unit" may be used interchangeably.

Figure 1:
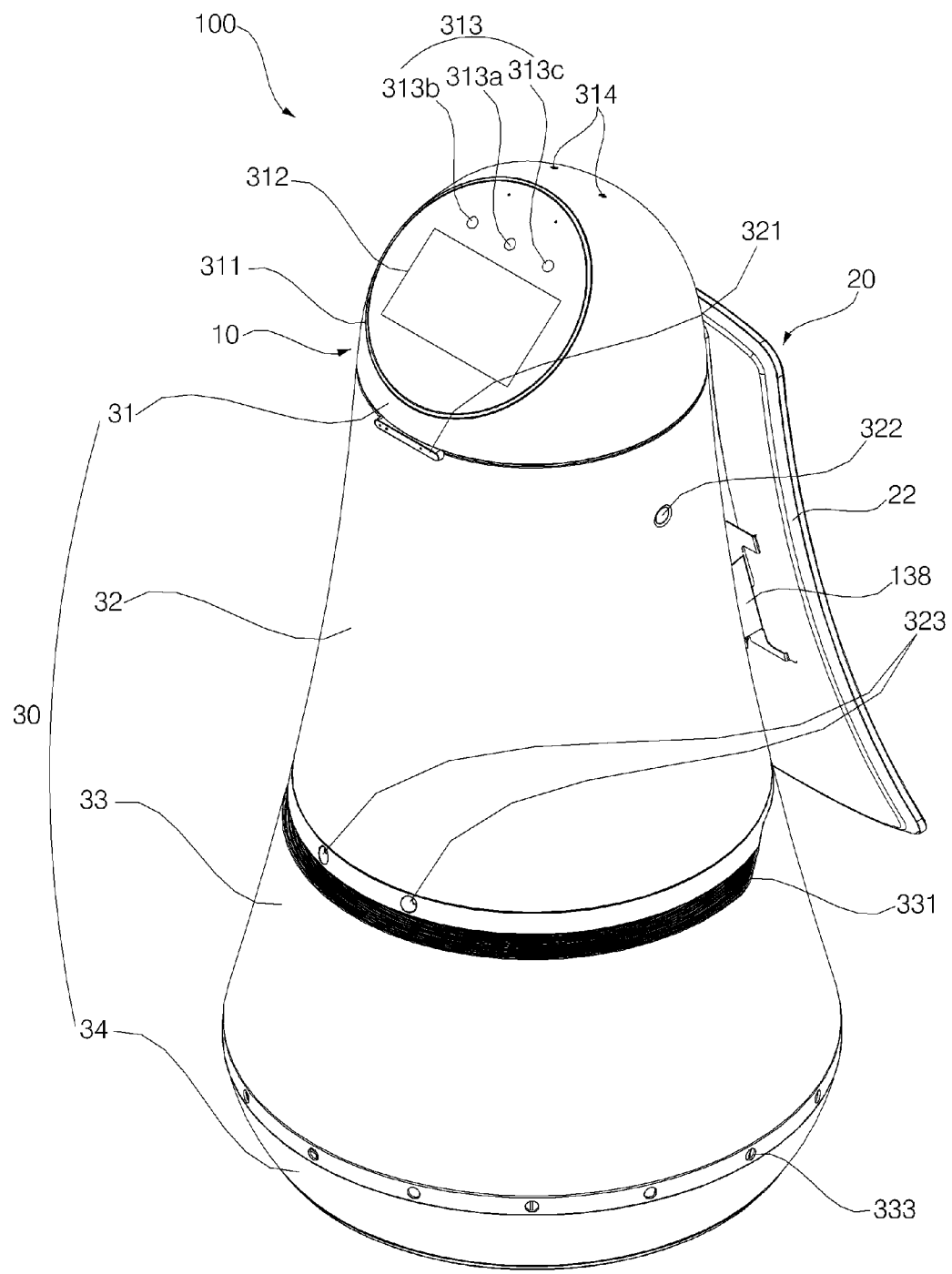
FIG. 1 is a perspective view of a mobile robot according to an embodiment of the present invention.
Figure 2:
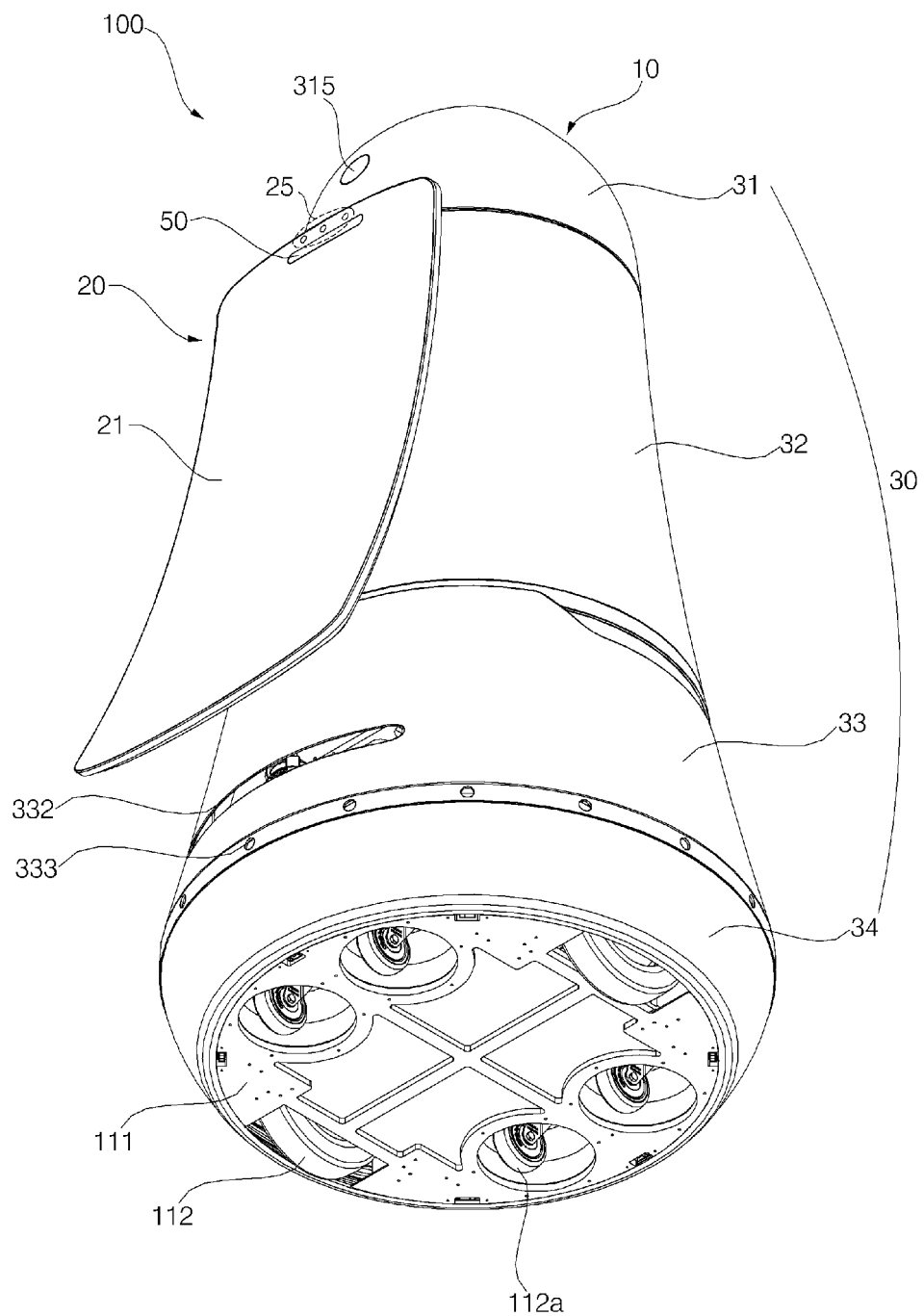
FIG. 2 is a perspective view of bottom of the mobile robot according to an embodiment of the present invention.
Figure 3:
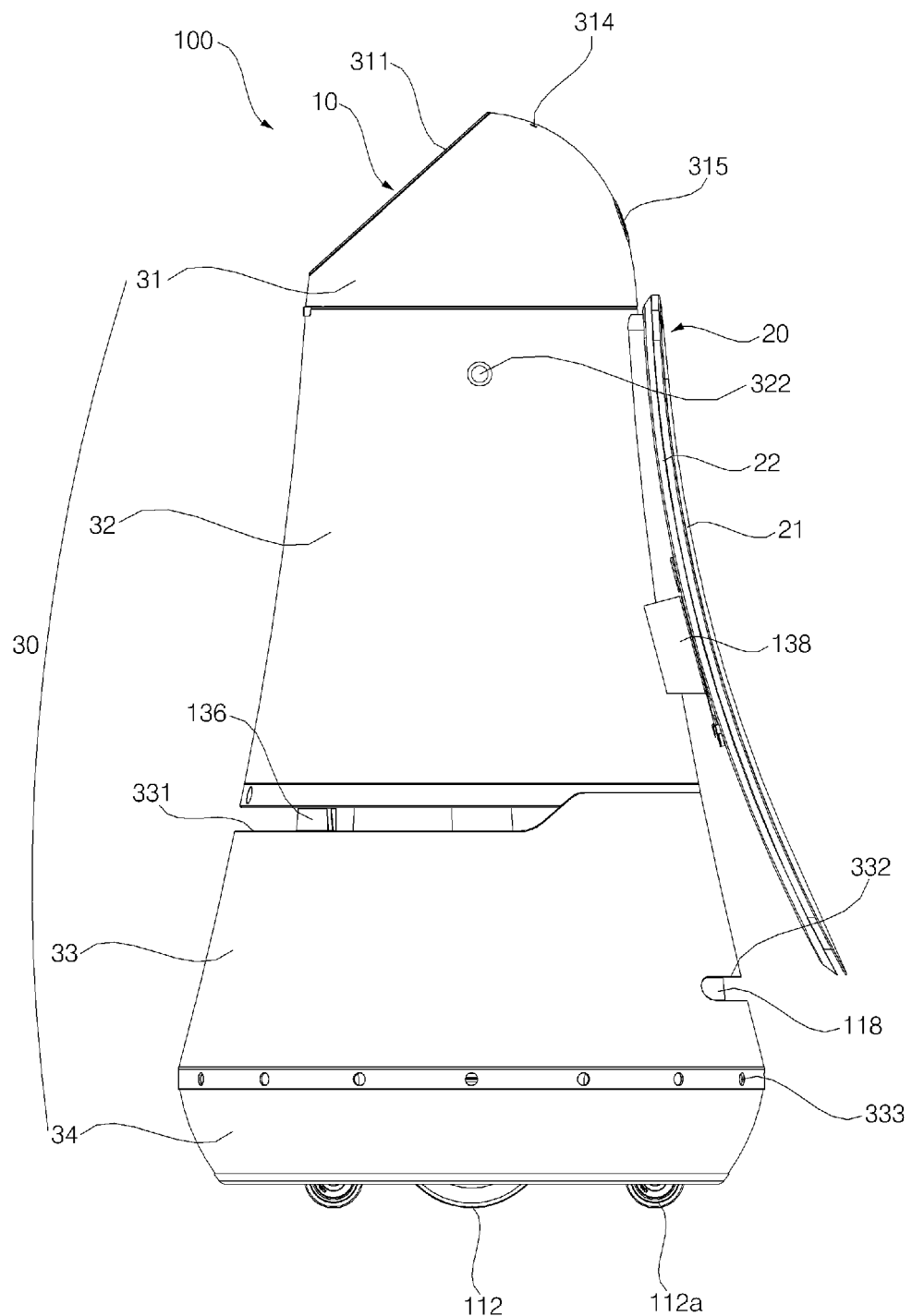
FIG. 3 is a side view of the mobile robot according to an embodiment of the present invention.
Figure 4:
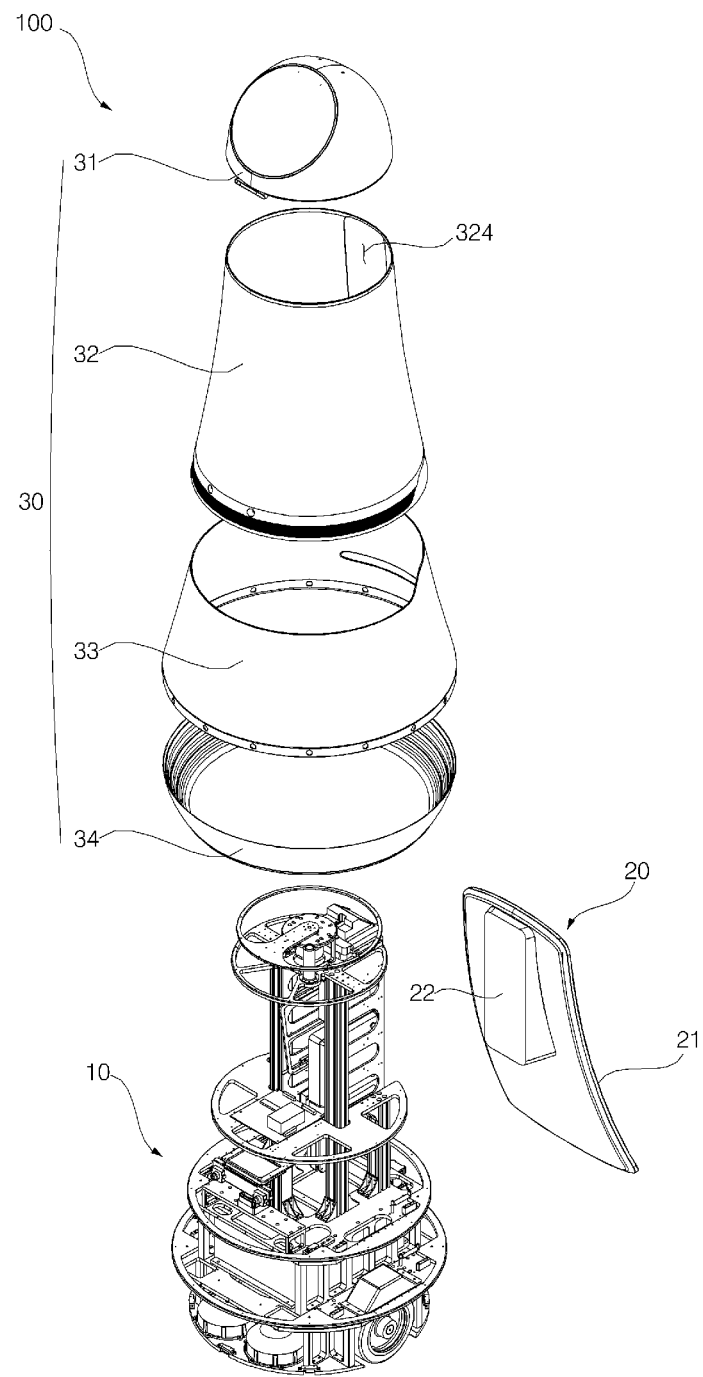
FIG. 4 is an exploded a perspective view of the mobile robot according to an embodiment of the present invention.

FIG. 1 is a perspective view of a mobile robot according to an embodiment of the present invention, FIG. 2 is a perspective view from the bottom of the mobile robot according to an embodiment of the present invention, FIG. 3 is a side view of the mobile robot according to an embodiment of the present invention, and FIG. 4 is an exploded perspective view of the mobile robot according to an embodiment of the present invention.

Referring to FIGS. 1 to 4, the mobile robot 100 according to an embodiment of the present invention may include a main body 10 that forms the exterior and accommodates various components therein.

The main body 10 is formed lengthwise and may have a roly-poly shape with the upper part slimmer than the lower part.

The main body 10 may include a case 30 that forms the exterior of the mobile robot 100. The case 30 may include a top cover 31 disposed at the top thereof, a first middle cover 32 disposed under the top cover 31, a second middle cover 33 disposed under the first middle cover 32, and a bottom cover 34 disposed under the second middle cover 33. Here, the first middle cover 32 and the second middle cover 33 may be formed as a single middle cover.

The top cover 31 is positioned at the top of the mobile robot 100 and may have a hemispheric or dome shape. The top cover 31 may be positioned at a height lower than the heights of adults in order to easily receive a command from a user. In addition, the top cover 31 may be configured to be able to rotate at a predetermined angle.

Further, the top cover 31 and a head part 15 provided therein may be disposed at the top of the mobile robot 100, have the shape and function of the human head, and interact with a user.

Accordingly, the top cover 31 and the head part 15 provided therein may be called a head. In addition, the remaining part disposed under the head may be called a body.

The top cover 31 may include an operating unit 311 provided on one side of the front thereof. The operating unit 311 can serve to receive commands from a user. To this end, the operating unit 311 may include a display 312 for receiving touch input from a user.

The display 312 provided in the operating unit 311 may be called a first display or a head display 312 and a display included in a display unit 280 provided in the body may be called a second display or a body display 21.

The head display 312 may be configured as a touchscreen by being layered with a touch pad. In this case, the head display 312 may also be used as an input device through which information can be input according to user's touch in addition to an output device.

In addition, the operating unit 311 can face upward at a predetermined angle such that a user can easily operate the operating unit 311 while looking down at the head display 312. For example, the operating unit 311 may be provided on a surface formed by cutting a part of the top cover 31. Accordingly, the head display 312 can be disposed to be inclined.

Further, the operating unit 311 may have a circular or oval appearance. The operating unit 311 may have a shape similar to the human face.

For example, the operating unit 311 may have a circular shape and one or more structures for representing the human eyes, nose, mouth, eyebrows and the like may be positioned on the operating unit 311.

That is, specific structures for representing the human eyes, nose, mouth, eyebrows and the like may be disposed on the operating unit 311 or the operating unit 31 may be painted with a specific paint. Accordingly, the operating unit 311 can provide emotional feeling to a user by having a shape of the human face. Furthermore, when a robot with a shape of the human face moves, repulsion against the robot can be eliminated because a user can feel as if a person moves.

As another example, one or more images for representing the human eyes, nose, mouth, eyebrows and the like may be displayed on the head display 312.

That is, various images for representing a shape of the human face may be displayed on the head display 312 as well as information related to a road guide service. In addition, an image for representing a facial expression at certain intervals or at a specific time may be displayed on the head display 312.

Meanwhile, the direction in which the operating unit 311 faces is defined as "front" and the direction opposite to "front" is defined as "rear" on the basis of FIG. 1.

In addition, the operating unit 311 may include a head camera unit 313 for recognizing persons and objects.

The head camera unit 313 may be disposed above the head display 312. The head camera unit 313 may include a 2D camera 313a and an RGBD sensor 313b and 313c.

The 2D camera 313a may be a sensor for recognizing a person or an object on the basis of a two-dimensional image.

In addition, the RGBD (Red, Green, Blue, Distance) sensor 313b and 313c may be a sensor for obtaining a position or a face image of a person. The RGBD sensor 313b and 313c may be a sensor for detecting a person or an object using captured images having depth data obtained from a camera or other similar 3D imaging devices including RGBD sensors.

To correctly detect a position or a face image of a person, a plurality of RGBD sensors 313b and 313c may be provided. For example, two RGBD sensors 313b and 313c may be provided and disposed on the left and right sides of the 2D camera 313a.

Although not illustrated, the operating unit 311 may further include physical buttons for directly receiving commands from a user.

In addition, the top cover 31 may further include a microphone 314.

The microphone 314 can execute a function of receiving an audio signal command from a user. For example, the microphone 314 may be formed at four arbitrary points at the top of the top cover 31 in order to correctly receive audio commands from a user. Accordingly, an audio road guide request can be correctly received from the user even during movement of the mobile robot 100 or rotation of the top cover 31.

In an embodiment of the present invention, when the mobile robot 100 is moving, the top cover 31 can rotate such that the operating unit 311 faces in the movement direction. In addition, the top cover 31 can rotate such that the operating unit 311 faces a position at which a user is located when a command (e.g., a voice command or the like) is received from the user during movement of the mobile robot 100.

On the other hand, the top cover 31 may rotate in a direction opposite to the movement direction of the mobile robot 100 when a command is received from the user during movement of the mobile robot 100. That is, the top cover 31 can rotate in a direction in which the body display unit 280 (body display 21 or display unit 280?) faces. Accordingly, the user can effectively operate the operating unit 311 while viewing road guide service information and the like displayed on the body display 280.

Figure 5:
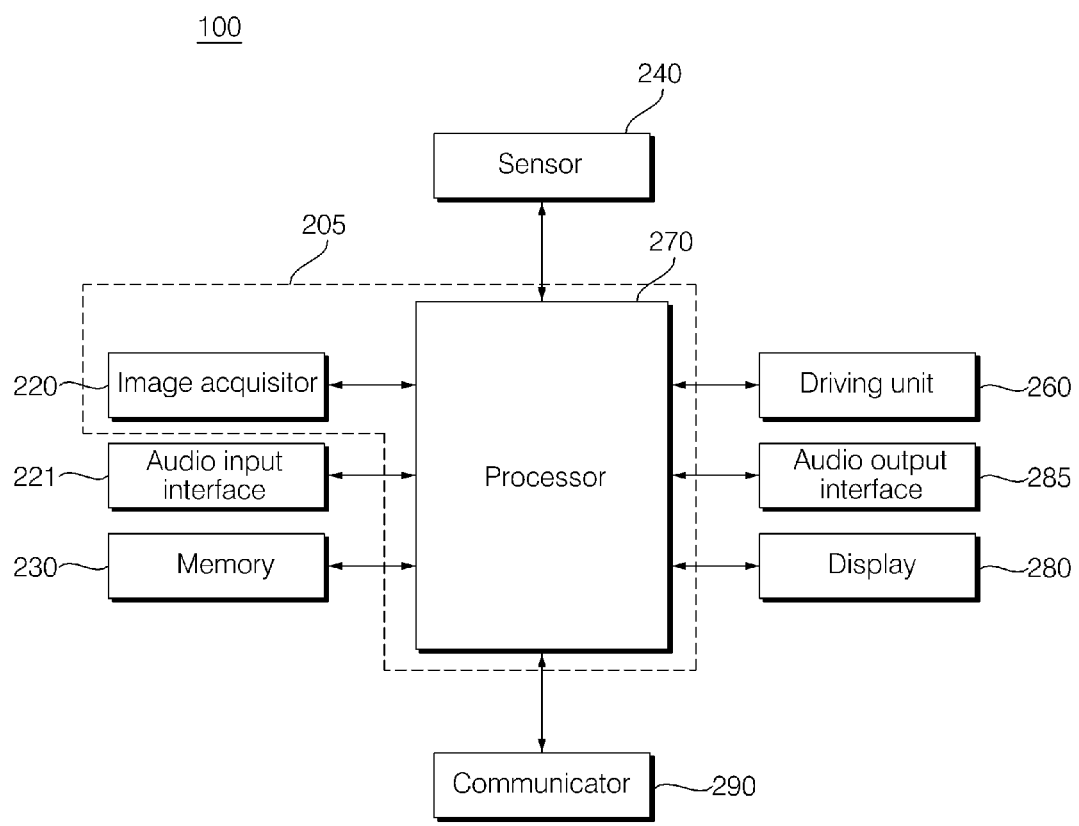
FIG. 5 is an exemplary internal block diagram of the mobile robot of FIG. 1.

FIG. 5 is an exemplary internal block diagram of the mobile robot of FIG. 1.

Referring to the figure, the mobile robot 100 according to an embodiment of the present invention may include an audio input unit 225 for receiving audio input from a user through the microphone 314, a storage unit 230 for storing various types of data, a communication unit 290 for transmitting/receiving data to/from other electronic devices such as a server (not shown), a sensing unit 240 for performing various sensing operations, a driving unit 260 for moving the main body 10, an audio output unit 285 for outputting sound, the display unit 280 for displaying various types of information, and an image processor 205.

The image processor 205 may include an image acquisition unit 229 including the aforementioned head camera unit 313 and a processor 270 for performing signal processing on an image acquired by the image acquisition unit.

Meanwhile, the image processor 205 may be called an image processing device 205 in the present description.

Further, the processor 270 may control overall operation of the mobile robot 100.

The audio input unit 225 may include or be connected to a processor for converting analog sound into digital data to convert an audio signal input by a user into data such that the processor 270 or a server (not shown) can recognize the audio signal.

The processor 270 may control overall operation of the mobile robot 100 by controlling the audio input unit 225, the storage unit 230, the communication unit 290, and the like constituting the mobile robot 100.

The storage unit 230 stores various types of information necessary to control the mobile robot 100 and may include a volatile or nonvolatile recording medium. A recording medium stores data readable by a microprocessor and examples thereof may include a hard disk drive (HDD), a solid state drive (SSD), a silicon disk drive (SDD), a ROM, a RAM, a CD-ROM, a magnetic tape, a floppy disk, an optical data storage device, etc.

In addition, the storage unit 230 may store various types of data necessary for the mobile robot 100 to provide guide services.

Furthermore, the processor 270 may transmit an operating state of the mobile robot 100, user input or the like to a server and the like through the communication unit 290.

The communication unit 290 includes at least one communication module and causes the mobile robot 100 to be connected to the Internet or a predetermined network.

Meanwhile, the storage unit 230 can store data for voice recognition and the processor 270 can process an audio input signal of a user received through the audio input unit 225 and perform a voice recognition process.

Further, the processor 270 may control the mobile robot 100 such that the mobile robot 100 performs a predetermined operation on the basis of a voice recognition result.

For example, when a command included in an audio signal is a command for requesting predetermined information such as flight departure information and tourist guide information, the processor 270 can control the display unit 280 such that the display unit 280 displays the predetermined information such as flight departure information and tourist guide information.

Further, when a user requests guidance, the processor 270 can control the mobile robot 100 such that the mobile robot 100 escorts the user to a destination selected by the user.

Meanwhile, the voice recognition process may be performed in the server instead of the mobile robot 100.

In this case, the processor 270 can control the communication unit 290 such that an audio signal input by the user is transmitted to the server and receive a recognition result with respect to the audio signal from the server through the communication unit 290.

Alternatively, simple voice recognition such as call word recognition may be performed in the mobile robot 100 and higher-order voice recognition such as natural language processing may be performed in the server.

The display unit 280 can display, as images, information corresponding to request input of a user, processing results corresponding to request input of a user, operation modes, operating states, error states, etc.

As described above with reference to FIGS. 1 to 4, the display unit 280 may include the head display 312 and the body display 21. Since the body display 21 is implemented such that it has a larger screen than that of the head display 312, it may be more desirable to display information on the large screen of the body display 21.

Further, the audio output unit 285 can output, as audio, warning sound, alarm messages such as operation modes, operating states and error states, information corresponding to request input of a user, processing results with respect to request input of a user, etc. according to control of the processor 270. The audio output unit 285 can convert an electronic signal from the processor 270 into an audio signal and output the audio signal. To this end, the audio output unit 285 may include a speaker and the like.

Further, the mobile robot 100 may include an image acquisition unit 220 which can capture images of a predetermined range.

The image acquisition unit 220 captures images of the surroundings and external environments of the mobile robot 100 and may include a camera module. For photographing efficiency, a plurality of cameras may be provided.

For example, the image acquisition unit 220 may include the head camera unit 313 for recognizing persons and objects and a body camera 25 for identifying and tracking a guide object, as described above with reference to FIGS. 1 to 4. However, the number, arrangement, type and photographing range of cameras included in the image acquisition unit 220 are not limited thereto.

The image acquisition unit 220 may capture an image for user recognition. The processor 270 may determine an external situation or recognize a user (guide object) based on images captured by the image acquisition unit 220.

In addition, the processor 270 may control movement of the mobile robot 100 based on images captured by the image acquisition unit 220.

Further, images captured by the image acquisition unit 220 may be stored in the storage unit 230.

Meanwhile, the mobile robot 100 may include a driving unit 260 for movement of the mobile robot 100, and the driving unit 260 may correspond to the driving unit 11 described above with reference to FIGS. 1 to 4. The driving unit 260 can move the main body 10 according to control of the processor 270.

Further, the mobile robot 100 may include the sensing unit 240 including sensors for sensing various types of data related to operations and states of the mobile robot 100.

The sensing unit 240 may include an obstacle sensor for sensing obstacles, and the obstacle sensor may include an infrared sensor, an ultrasonic sensor, an RF sensor, a geomagnetic sensor, a position sensitive device (PSD) sensor, and the like.

For example, the obstacle sensor may correspond to the ultrasonic sensor 333, the RGBD sensor 321, and the like, described above with reference to FIGS. 1 to 4.

In addition, the sensing unit 240 may further include a cliff sensor 113 for sensing presence or absence of a cliff on a floor within a movement area.

According to an embodiment, the sensing unit 240 may further include a sensor for sensing the level of sound acquired through the microphone 314 to sense the magnitude of speech of a user and the magnitude of background noise.

Alternatively, the sensing unit 240 may not include additional sensors, and the audio input unit 225 may detect speech of a user and the magnitude of background noise in a process of processing signals acquired through the microphone 314.

Further, the sensing unit 240 may include light detection and ranging (Lidar) devices 136 and 118.

The Lidar devices 136 and 118 can detect an object such as an obstacle based on time of flight (TOF) of a transmitted signal and a received signal or a phase difference between the transmitted signal and the received signal through laser light.

Further, the Lidar devices 132a and 132b can detect a distance from an object, a relative speed with respect to the object, and the position of the object.

The Lidar devices 132a and 132b can be included as a part of components of the obstacle sensor. Further, the Lidar devices 132a and 132b may be included as a sensor for generating a map.

The obstacle sensor detects an object present in a traveling (movement) direction of the mobile robot, particularly, an obstacle, and transmits obstacle information to the processor 270. Here, the processor 270 can control movement of the mobile robot 100 based on the detected position of the obstacle.

Further, the sensing unit 240 may further include an operation sensor for sensing an operation of the mobile robot 100 according to driving of the main body 101 and outputting operation information. For example, a gyro sensor, a wheel sensor, an acceleration sensor or the like may be used as the operation sensor.

The gyro sensor senses a rotation direction and detects a rotation angle when the mobile robot 100 moves in an operation mode. The gyro sensor detects an angular velocity of the mobile robot 100 and outputs a voltage value proportional to the angular velocity. The processor 270 calculates a rotation direction and a rotation angle using the voltage value output from the gyro sensor.

The wheel sensor is connected to left and right wheels and detects the numbers of rotations of the wheels. Here, the wheel sensor may be a rotary encoder. The rotary encoder detects and outputs the numbers of rotations of the left and right wheels.

The processor 270 can calculate rotation speeds of the left and right wheels using the numbers of rotations. Further, the processor 270 can calculate a rotation angle using a difference between the numbers of rotations of the left and right wheels.

The acceleration sensor senses changes in the speed of the mobile robot 100, for example, changes in the mobile robot 100 due to start, stop, direction change, collision with objects, and the like. The acceleration sensor may be attached to a portion in proximity to a main wheel or an auxiliary wheel and detect sliding or idling of a wheel.

In addition, the acceleration sensor may be included in the processor 270 and detect changes in the speed of the mobile robot 100. That is, the acceleration sensor detects impulse according to speed change and outputs a voltage value corresponding thereto. Accordingly, the acceleration sensor can serve as an electronic bumper.

The processor 270 can calculate changes in the position of the mobile robot 100 based on operation information output from the operation sensor. This position is a relative position corresponding to an absolute position using image information. The mobile robot can improve position recognition performance using image information and obstacle information through such relative position recognition.

Meanwhile, the processor 270 can provide predetermined information and services by combining the two displays 312 and 21 included in the mobile robot in various manners.

The processor 270 may control the first display 312 and/or the second display 21 to display a predetermined screen in response to audio input received through the audio input unit 225 or touch input received through the first display 312.

In this case, the processor 270 can control at least one of the first display 312 and the second display 21 to display a predetermined screen on the basis of the type and quantity of information included in the predetermined screen to be displayed.

The processor 270 can control a suitable display 312 or 21 such that the suitable display displays information according to purpose such as the quantity of information to be displayed and operation thereof.

For example, when the mobile robot 100 stands by, the processor 270 can control the second display 21 having a larger screen than the first display 312 such that the second display 21 displays a standby screen.

The standby screen may include at least one of general guide information, a notice and a predetermined advertisement of a public place in which the mobile robot 100 is disposed.

In addition, the standby screen may sequentially include guide screens and advertisement screens of predetermined destinations. That is, when the mobile robot 100 stands by, the processor 270 can control guide screens and advertisement screens of predetermined destinations such that they are sequentially displayed.

Further, the standby screen may be configured differently depending on places where the mobile robot 100 is disposed.

Meanwhile, the processor 270 may perform signal processing on images from the image acquisition unit 220 and, particularly, perform segmentation on images to identify objects.

Figure 6A:
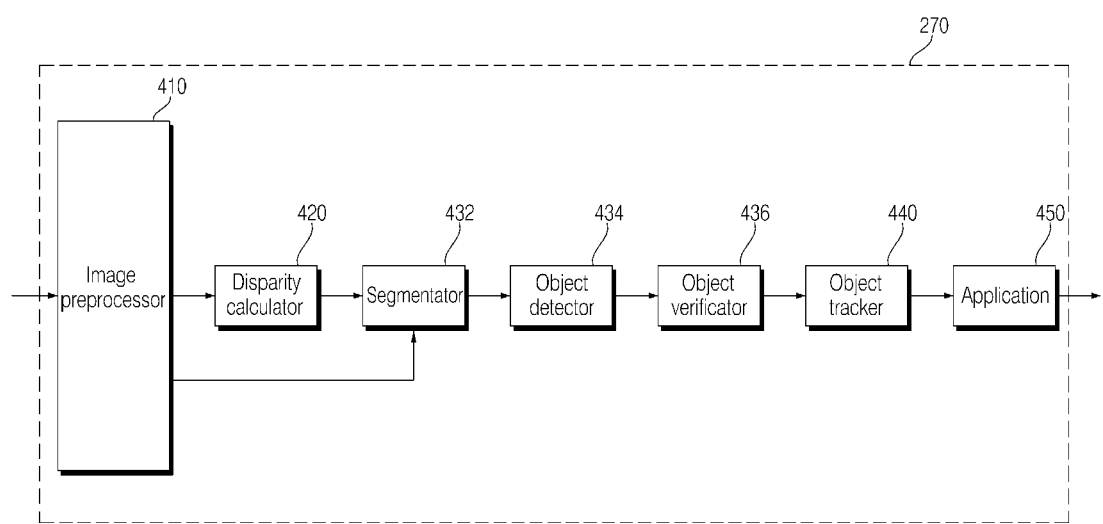
FIG. 6a and FIG. 6b are exemplary internal block diagrams of the processor of FIG. 5.
Figure 6B:
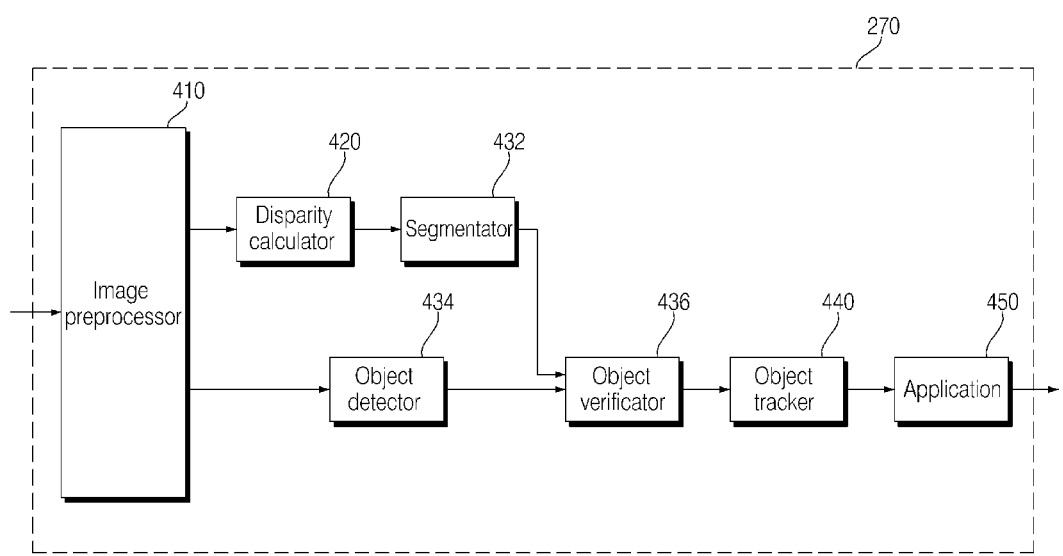
Figure 7:
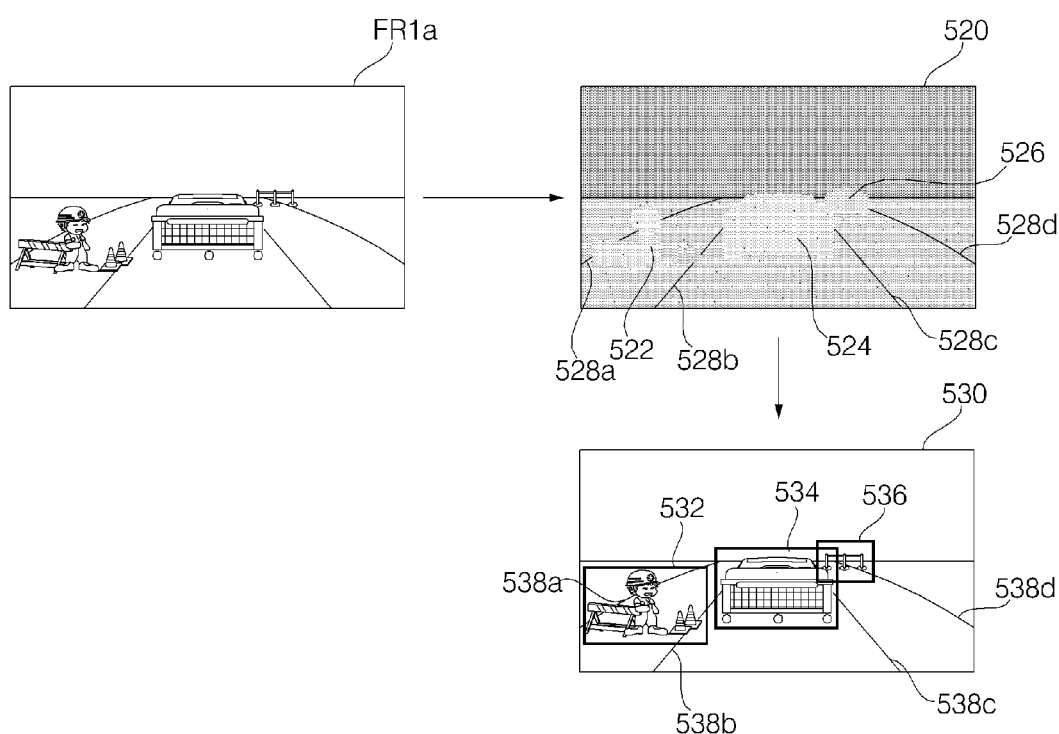
FIG. 7 is a diagram referred to for description of operation of FIG. 6a and FIG. 6b.

FIGS. 6*a* and 6*b* are exemplary internal block diagrams of the processor of FIG. 5 and FIG. 7 is a diagram referred to for description of operations of FIGS. 6*a* and 6*b*.

First, referring to FIG. 6*a*, FIG. 6*a* is an exemplary internal block diagram of the processor 270 of the mobile robot 100.

The processor 270 may include an image preprocessor 410, a disparity calculator 420, an object detector 434, an object tracking unit 440, and an application 450.

The image preprocessor 410 may receive an image from the image acquisition unit 220 and perform preprocessing thereon.

Specifically, the image preprocessor 410 may perform noise reduction, rectification, calibration, color enhancement, color space conversion (CSC), interpolation, camera gain control, etc. on an image. Accordingly, a clearer image than an image captured by the image acquisition unit 220 can be obtained.

The disparity calculator 420 receives images processed by the image preprocessor 410 and obtains a disparity map using the received images, that is, depth information of RGBD images. That is, the disparity calculator 420 can obtain disparity information about the surroundings of the mobile robot 100.

Meanwhile, a disparity map refers to a map that represents binocular parallax information of images, that is, left and right images, as numerical values.

A segmentation unit 432 may perform segmentation and clustering in an image on the basis of disparity information from the disparity calculator 420.

Specifically, the segmentation unit 432 can separate a background and a foreground from at least one image on the basis of disparity information.

For example, the segmentation unit 432 can calculate a region having disparity information equal to or less than a predetermined value in a disparity map as a background and exclude the region. Accordingly, a foreground can be relatively separated.

Alternatively, the segmentation unit 432 can calculate a region having disparity information equal to or greater than the predetermined value in the disparity map as a foreground and extract the region. Accordingly, the foreground can be separated.

In this manner, when the background and the foreground are separated on the basis of the disparity information based on images, a signal processing speed can be increased and the quantity of signal processing can be reduced in the following object detection.

The object detector 434 can detect an object on the basis of image segments from the segmentation unit 432.

That is, the object detector 434 can detect an object with respect to at least one image on the basis of disparity information.

Specifically, the object detector 434 can detect an object with respect to at least one image. For example, the object detector 434 can detect an object from a foreground separated through image segmentation.

Then, an object verification unit 436 classifies and verifies a detected object.

To this end, the object verification unit 436 may use an identification method using a neural network, an SVM (Support Vector Machine) method, an identification method according to AdaBoost using Haar-like characteristics, a HOG (Histograms of Oriented Gradients) method, or the like.

The object verification unit 436 may verify an object by comparing a detected object with objects stored in the memory 240.

For example, the object verification unit 436 can verify a neighboring mobile robot 100, lanes, road surfaces, signs, danger zones, tunnels, etc. present around the mobile robot 100.

The object tracking unit 440 performs tracking of a verified object. For example, the object tracking unit 440 may verify an object in sequentially obtained images, calculate motions or motion vectors of the verified object and track movement of the object on the basis of the calculated motions or motion vectors. Accordingly, it is possible to track obstacles, signs and the like present around the mobile robot 100.

FIG. 6B is another exemplary internal block diagram of the processor.

Referring to the figure, the processor 270 shown in FIG. 6*b* has the same internal configuration as that of the processor 270 shown in FIG. 6*a* and differs from the processor 270 of FIG. 6*a* with respect to signal processing order. Hereinafter, only differences therebetween will be described.

The object detector 434 may receive an image and detect an object in the image. Distinguished from FIG. 6*a*, the object detector 434 can directly detect the object from the image instead of detecting an object with respect to a segmented image based on disparity information.

Then, the object verification unit 436 classifies and verifies the detected and separated object on the basis of image segments from the segmentation unit 432 and the object detected by the object detector 434.

To this end, the object verification unit 436 may use an identification method using a neural network, an SVM (Support Vector Machine) method, an identification method according to AdaBoost using Haar-like characteristics, a HOG (Histograms of Oriented Gradients) method, or the like.

Referring to FIG. 7, the image acquisition unit 220 sequentially obtains images FR1*a* for an image frame period.

The disparity calculator 420 in the processor 270 receives the images FR1*a* processed in the image preprocessor 410 and obtains a display map 520 using the received images FR1*a*, particularly, depth information of RGBD images.

The display map 520 represents a binocular parallax between the images RF1*a* as a level and can represent a longer distance from the mobile robot 100 as disparity levels increase and a shorter distance from the mobile robot 100 as the disparity levels decrease.

When such a disparity map is displayed, the disparity map may be displayed such that luminance increases as disparity levels increase and decreases as the disparity levels decrease.

The figure illustrates that a plurality of lines 528*a*, 528*b*, 528*c* and 528*d* respectively have disparity levels corresponding thereto in the display map 520 and a construction area 522, a first front obstacle 524 and a second front obstacle 526 respectively have disparity levels corresponding thereto.

The segmentation unit 424, the object detector 434 and the object verification unit 436 perform segmentation, object detection and object verification on the images FR1a on the basis of the disparity map 520.

The figure illustrates that object detection and verification are performed on the image FR1a using the disparity map 520.

That is, object detection and verification can be performed on the plurality of lines 538a, 538b, 538c and 538d, the construction area 532, the first front obstacle 534 and the second front obstacle 536 in an image 530.

Meanwhile, images may be continuously obtained and the object tracking unit 440 may perform tracking on verified objects.

To improve the accuracy of object segmentation in FIGS. 6a and 6b, deep learning-based fully convolutional networks (FCN) may be used. This will be described with reference to FIG. 8.

Figure 8:
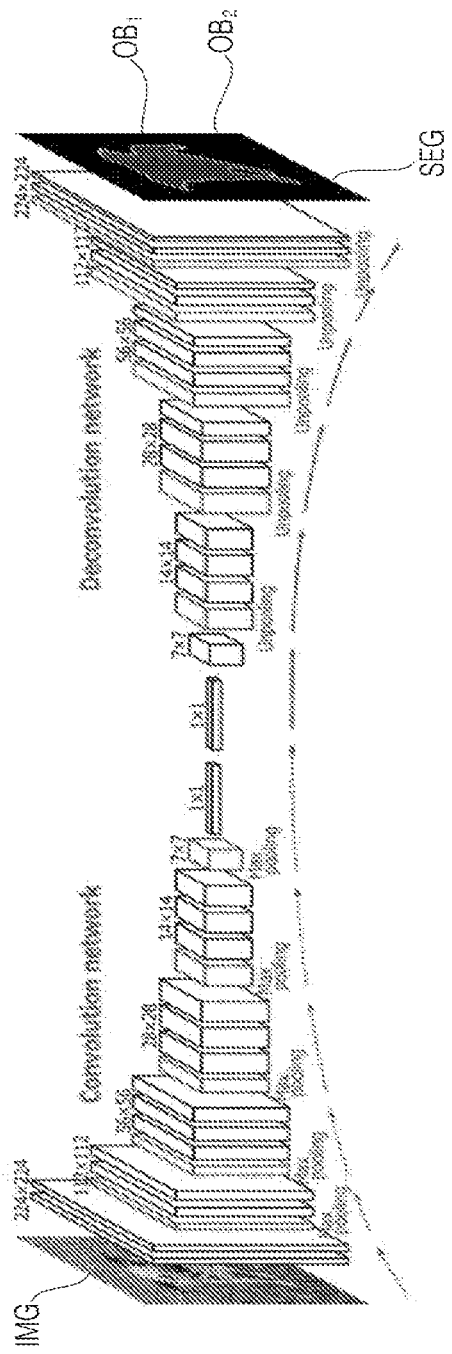
FIG. 8 is a diagram describing segmentation according to fully convolutional networks (FCN).

FIG. 8 is a diagram for describing segmentation according to fully convolutional networks (FCN).

Referring to the figure, when fully convolutional networks are used for an obtained image IMG, results in units of pixels in the image are derived.

Particularly, a convolution network and a deconvolution network are used.

According to such convolution networks, convolution pooling is repeatedly performed.

According to the FCN technique of FIG. 8, information on the entire input image is used in order to determine the type of pixels in the image. This can be regarded as deepening of networks for calculation.

Meanwhile, as the networks for operation become deeper, an area that needs to be considered becomes wider and the amount of required calculation increases.

Consequently, according to the FCN technique, signal processing needs to be performed in units of pixels that are a minimum unit in an image, and thus a considerably large amount of calculation is required even when objects OB1 and OB2 are finally divided according to object segmentation as shown in the figure. Accordingly, a graphics processing unit (GPU) for processing the amount of calculation may be needed. As a result, the FCN technique may bring about a problem that manufacturing costs increase.

Accordingly, the present invention proposes a method for rapidly and accurately performing segmentation of an image while solving the problem of the FCN technique. Particularly, the present invention proposes a method which can be processed in a processor without using an additional GPU.

For example, the present invention uses a local convolutional neural network technique. This will be described with reference to FIG. 9 and the following figures.

Figure 9:
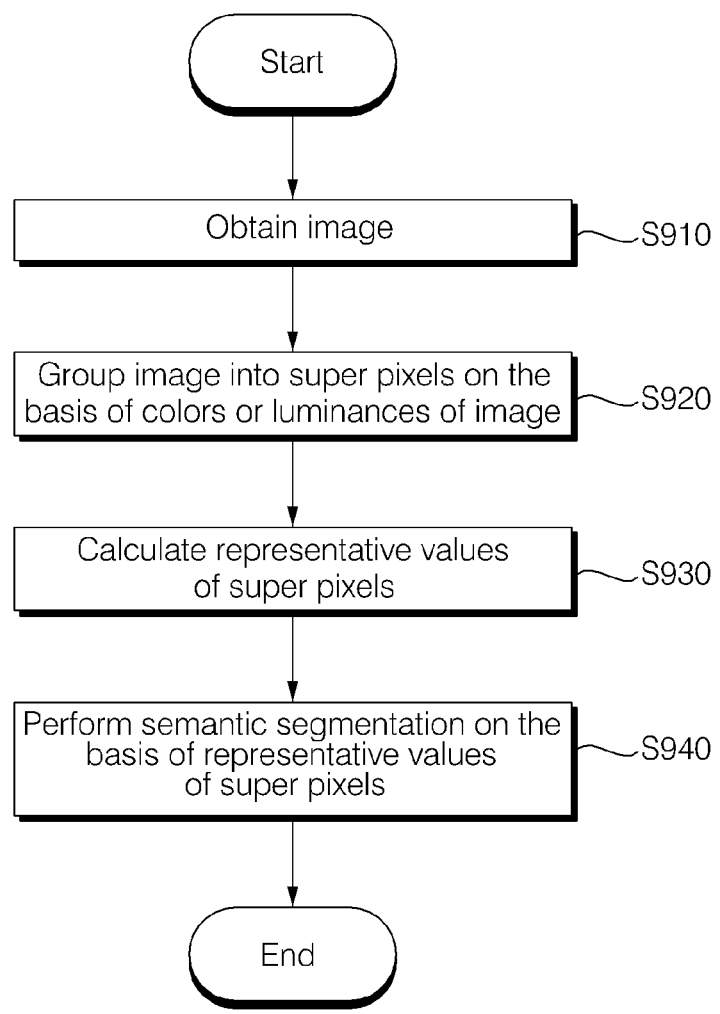
FIG. 9 is a flowchart illustrating an operating method of an image processing apparatus according to an embodiment of the present invention.

FIG. 9 is a flowchart illustrating an operating method of an image processing apparatus according to an embodiment of the present invention and FIGS. 10 to 16 are diagrams referred to for description of the operating method of FIG. 9.

First, referring to FIG. 9, the image acquisition unit 220 acquires an image (S910).

For example, the image acquisition unit 220 may acquire an RGB image or an RGBD image from the head camera unit 313. The acquired image is transmitted to the processor 270.

Then, the processor 270 may group super pixels in the image on the basis of the colors or luminances of the image (S920).

The processor 270 may group super pixels including a plurality of pixels and having a first size on the basis of the colors and luminances of the image. Such a super pixel may be called a block.

For example, the processor 270 may group super pixels in the image on the basis of the colors of the image such that the super pixels in the image have different sizes.

Alternatively, the processor 270 may group the super pixels in the image on the basis of the luminances of the image such that the super pixels in the image have different sizes.

Super pixels may be classified as similar colors or similar luminances. A super pixel may be a group of 50 to 100 pixels that are minimum units.

The shape of a super pixel is not limited to a rectangular shape and may be various shapes for distinguishing edges, such as a triangular shape and a polygonal shape.

Meanwhile, it is desirable that super pixels in an image not overlap for rapid calculation, and the like.

Subsequently, the processor 270 may calculate representative values of super pixels (S930) and perform segmentation on the basis of the representative values of the super pixels (S930).

For example, for segmentation, the processor 270 can perform convolution, pooling and filtering using representative values of super pixels.

Further, the processor 270 may perform semantic segmentation based on deep learning.

The processor 270 may separate an object in the image through segmentation.

In addition, the processor 270 may extract a region in which the mobile robot 100 can move through segmentation.

Figure 10:
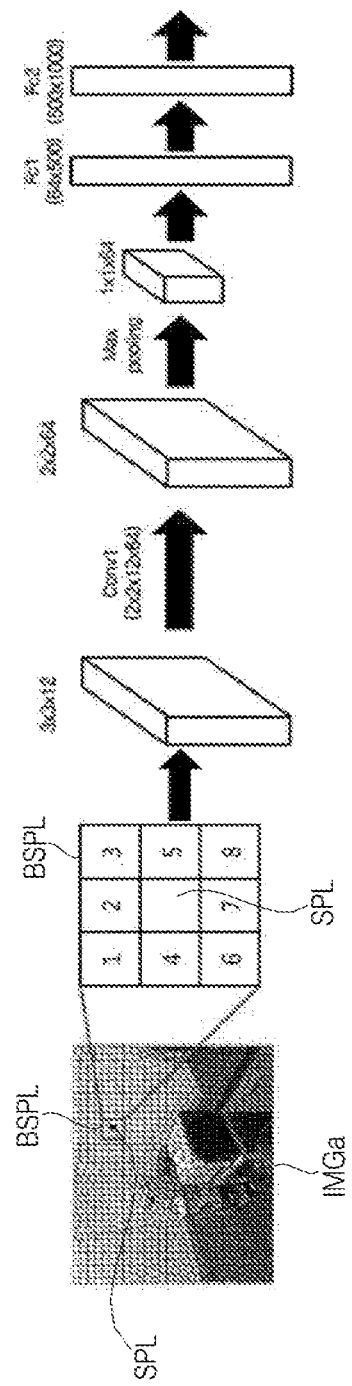
FIG. 10 to FIG. 16 are diagrams referred to for description of the operating method of FIG. 9.

FIG. 10 is a diagram referred to for description of semantic segmentation based on deep learning.

Referring to the figure, FIG. 10 illustrates a local convolutional neural network (CNN) method.

First, the processor 270 groups super pixels (SPL) that are sets of a plurality of pixels on the basis of the colors or luminances of an image.

In addition, the processor 270 performs network calculation in units of 3*3 patch (BSPL) including the surroundings of a super pixel and the super pixel for calculation with respect to the super pixel SPL.

Particularly, convolution, max pooling and filtering (FC1 and FC2) can be performed in units of 3*3 patch (BSPL).

Accordingly, calculation results based on super pixels SPL can be derived, and as a result, results in units of pixels can be obtained using the calculation results.

According to this local CNN technique, rapid and accurate calculation can be performed because down convolution illustrated in FIG. 8 is not performed.

That is, it is possible to perform rapid and accurate calculation while performing deep learning based semantic segmentation.

Figure 11A:
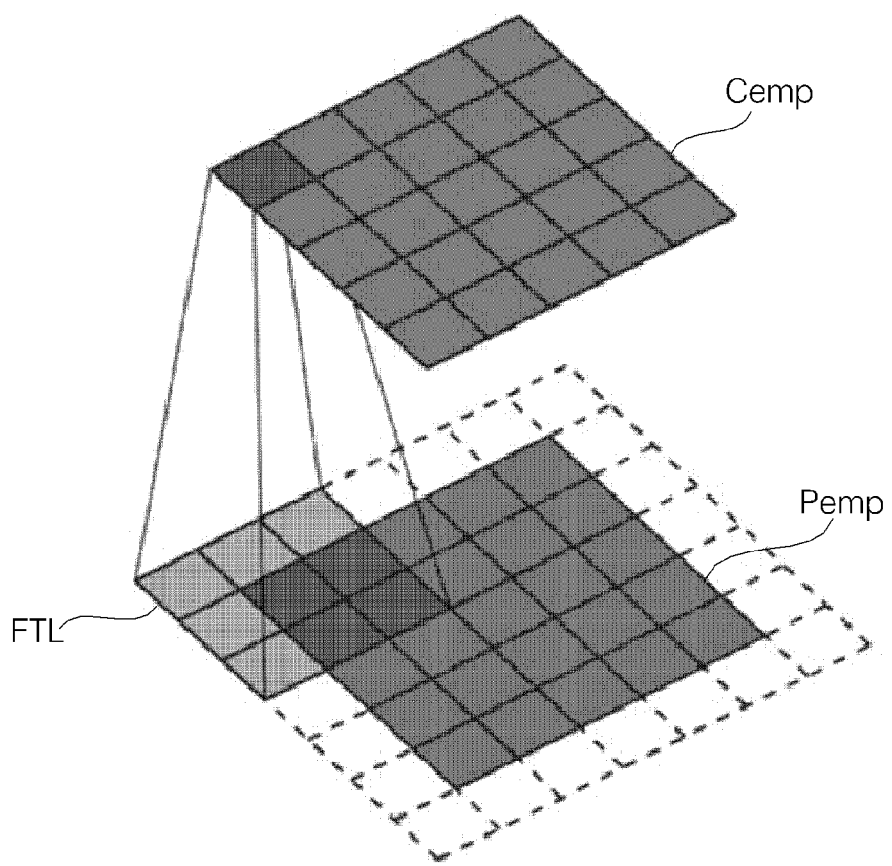

FIG. 11a is a diagram illustrating convolution conv1 of FIG. 10.

Referring to the figure, convolution using a filter FTL may be performed on a previous convolution layer pemp and values with respect to a current convolution layer Cemp may be calculated.

Figure 11B:
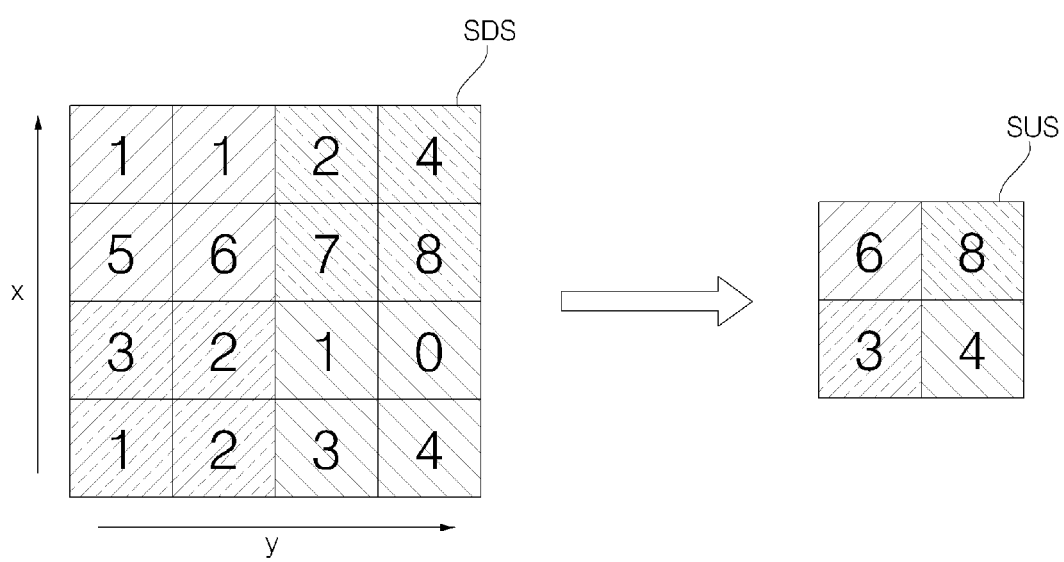

FIG. 11b is a diagram illustrating pooling of FIG. 10a.

Referring to the figure, 282 result values SUS can be calculated through subsampling using a 2*2 filter for a 4*4 single depth slice (SDS). Accordingly, it is possible to select only effective information while reducing the amount of calculation through subsampling.

Meanwhile, convolution conv1, pooling and the like in the CNN technique of FIG. 10 may be performed for a plurality of channels.

That is, the processor 270 can control segmentation such that it is performed for a plurality of channels.

Specifically, the processor 270 may perform network calculation on the basis of representative values of super pixels and perform semantic segmentation according to a plurality of channels.

Here, a plurality of channels may include a channel with respect to 2D coordinates of the image, a channel with respect to the luminances and colors of the image, a channel with respect to the depth of the image, a channel with respect to a normal vector of the image, and a channel with respect to 3D coordinates of the image.

Figure 12A:
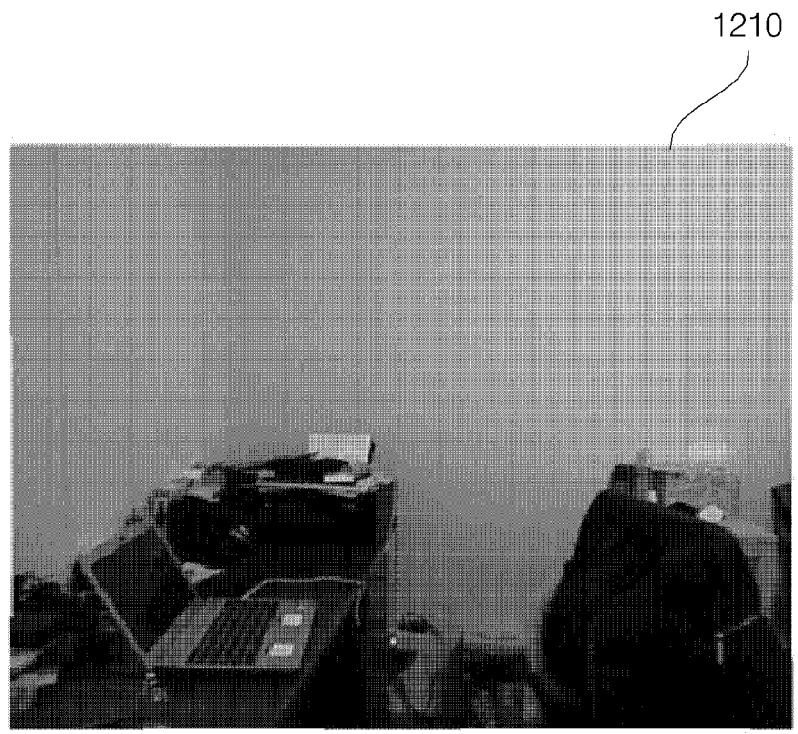
Figure 12B:
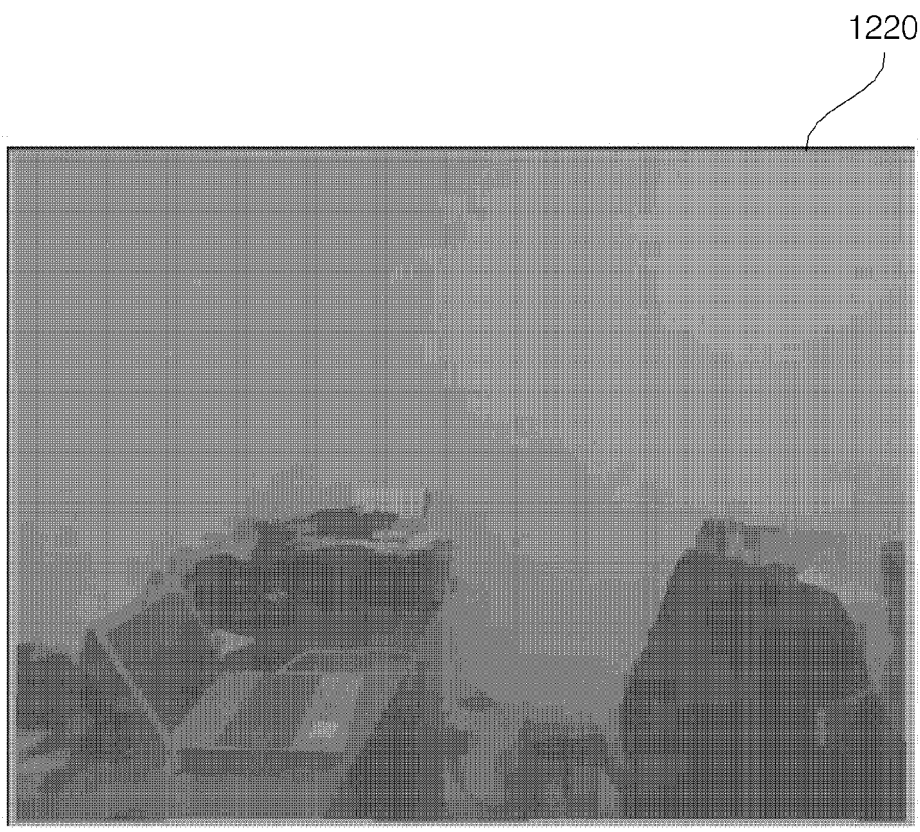
Figure 12C:
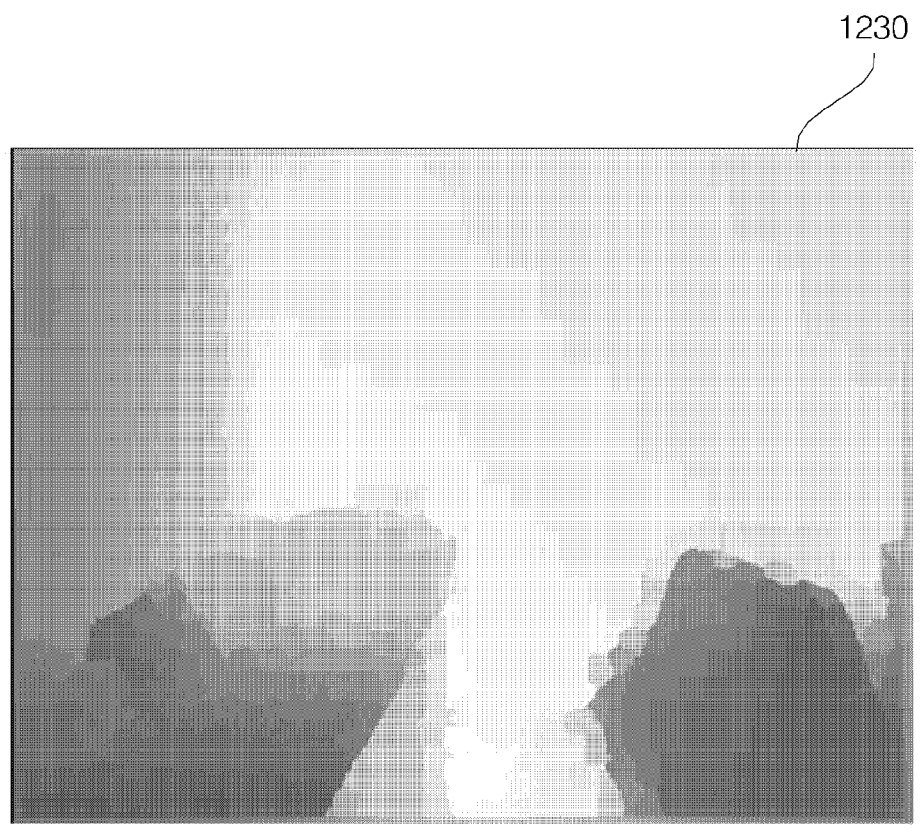
Figure 12D:
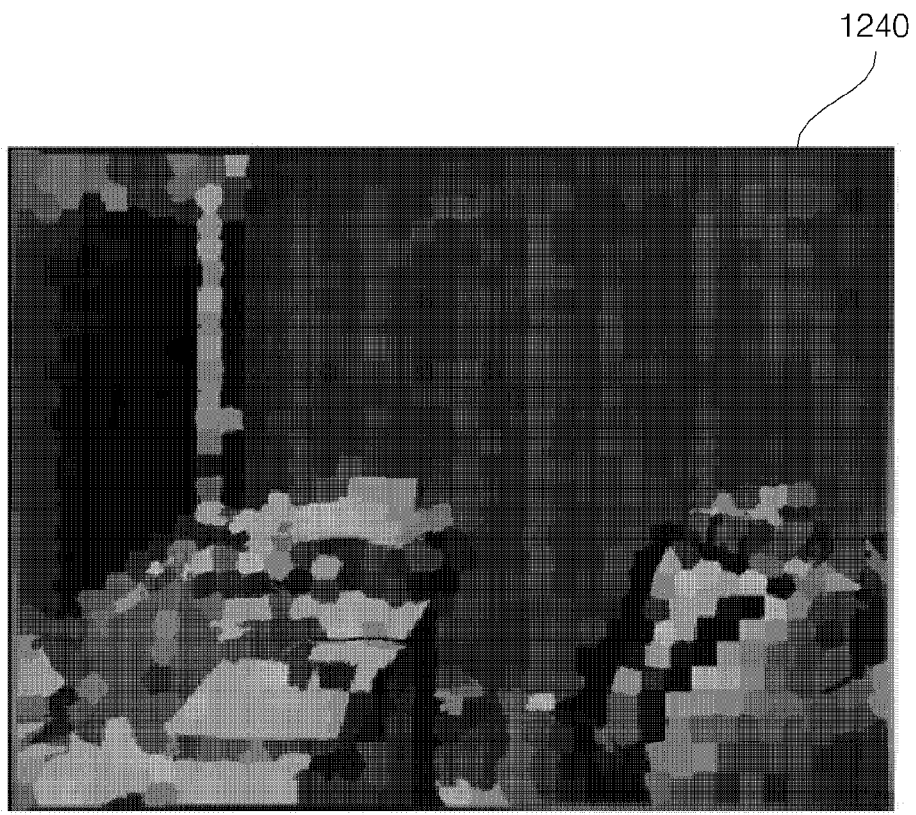
Figure 12E:
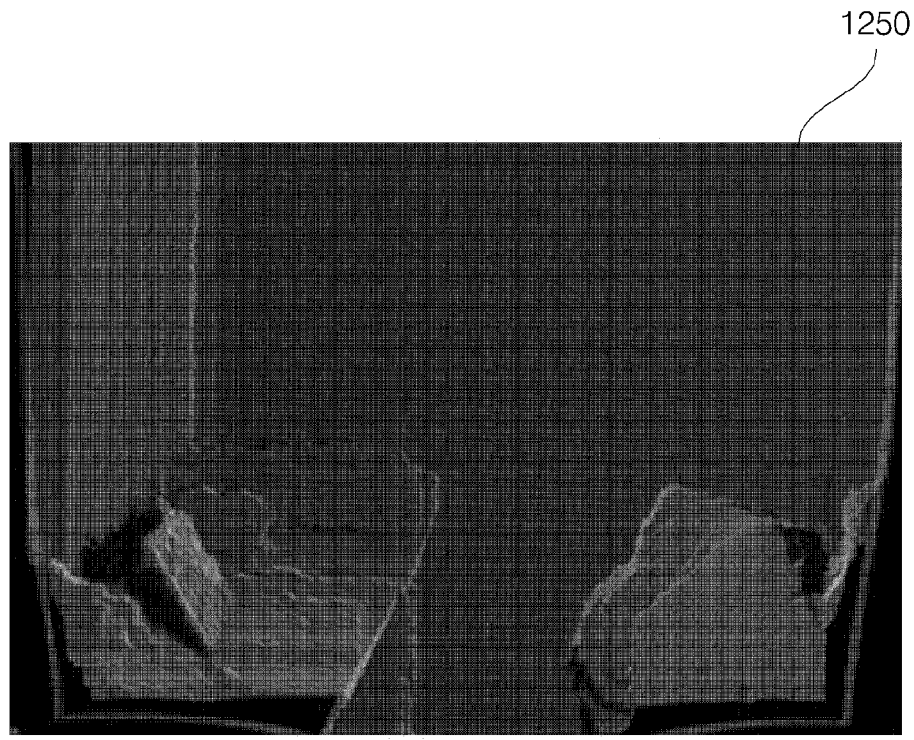
Figure 13:
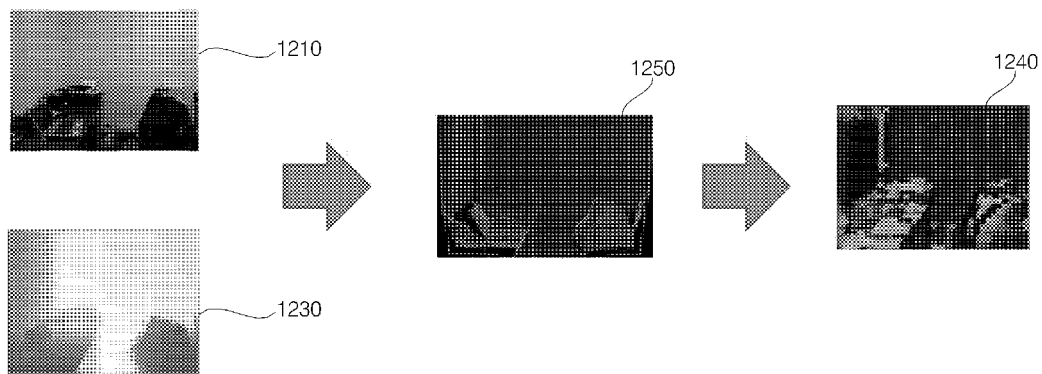

FIG. 12a illustrates an image 1210 representing 2D coordinates, FIG. 12b illustrates an image 1220 representing a Lab image, FIG. 12c illustrates an image 1230 representing depth, FIG. 12d illustrates an image 1240 representing a normal vector, and FIG. 12e illustrates an image 1250 representing 3D coordinates of an image.

The 2D coordinates represent a pixel position in the image, the Lab image represents levels of luminances and colors of the image, the depth represents a distance from the image acquisition unit 220, the normal vector represents a plane (ground) normal vector on a three-dimensional space corresponding to image pixels, and the 3D coordinates represent coordinates for distinguishing an object according to distance.

The processor 270 may calculate the image 1250 representing 3D coordinates of the image using the image 1210 representing 2D coordinates and the image 1230 representing the depth and further calculate the image 1240 representing the normal vector.

Meanwhile, the plurality of channel may be 12 channels.

Figure 14:
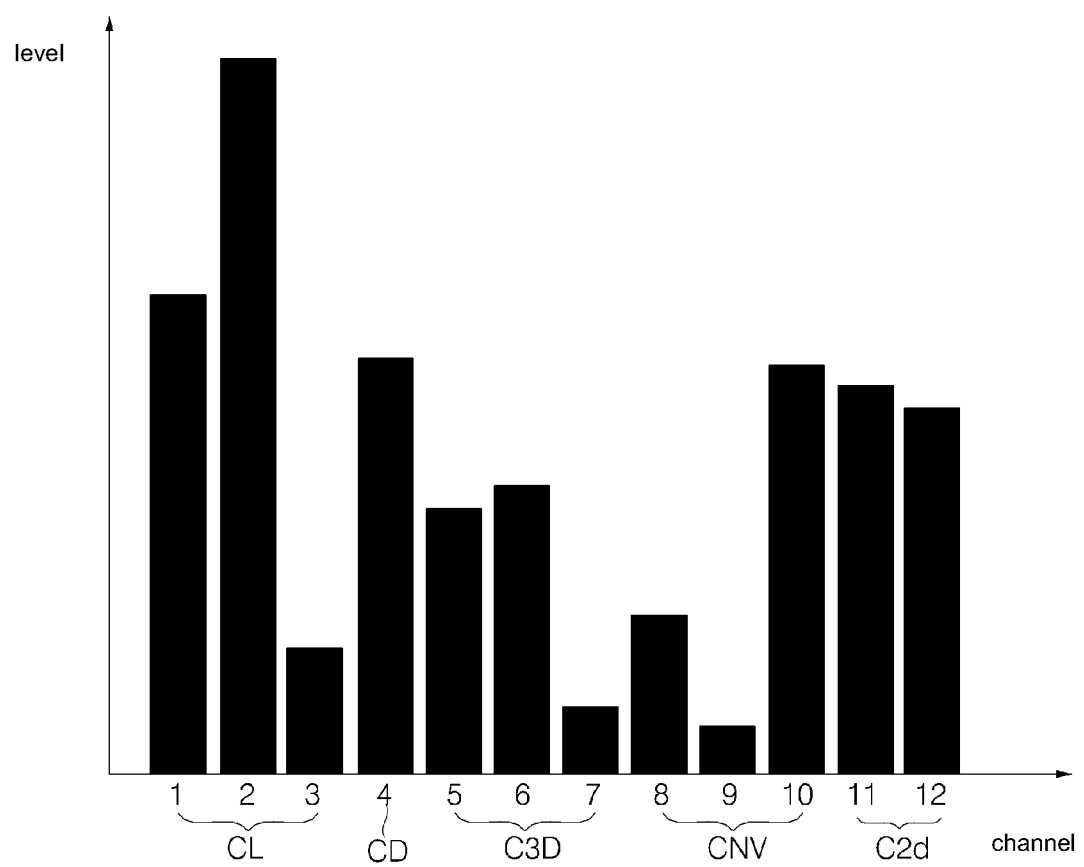

FIG. 14 illustrates levels for three channels CL with respect to a Lab image, a channel CD with respect to depth, channels C3D with respect to 3D (X,Y,Z) coordinates corresponding to an image pixel, three channels CNV with respect to a normal vector, and two channels C2d with respect to 2D coordinates.

The processor 270 may perform segmentation on the basis of level values for a plurality of channels and distinguish regions in an image.

Particularly, the processor 270 can use channels with higher levels when distinguishing regions in the image.

For example, the processor 270 can allocate weights to a plurality of channels and distinguish regions in an image on the basis of the allocated weights and level values for the plurality of channels.

Specifically, the processor 270 can allocate a higher level to a channel with a higher level and distinguish regions in an image on the basis of the corresponding channel. Accordingly, it is possible to accurately distinguish a region in an image, that is, distinguish and detect an object.

Figure 15A:
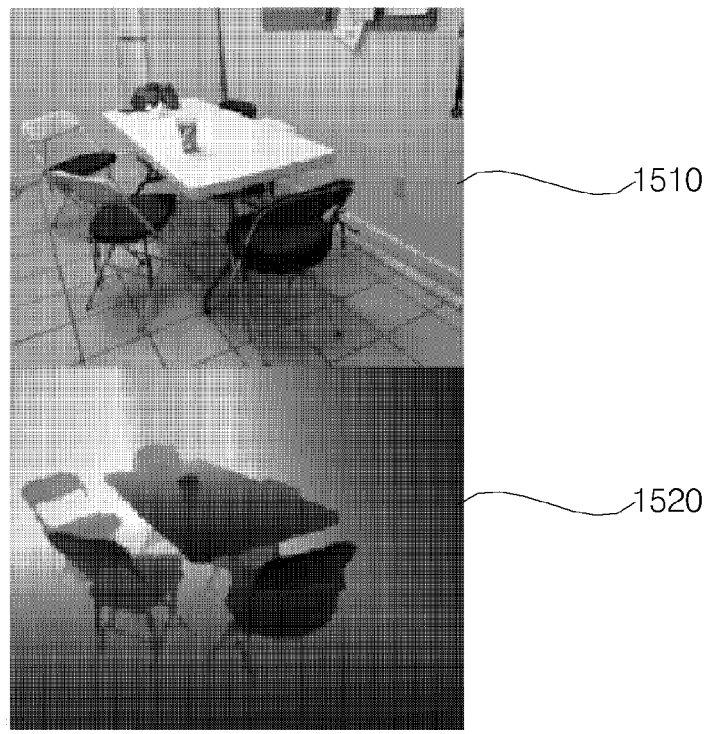

FIG. 15a illustrates an RGB image 1510 and a depth image 1520 from the image acquisition unit 220.

For example, the RGB image 1510 and the depth image 1520 can be obtained using the 2D camera 313a and the RGBD sensors 313b and 313c in the head camera unit 313.

Figure 15B:
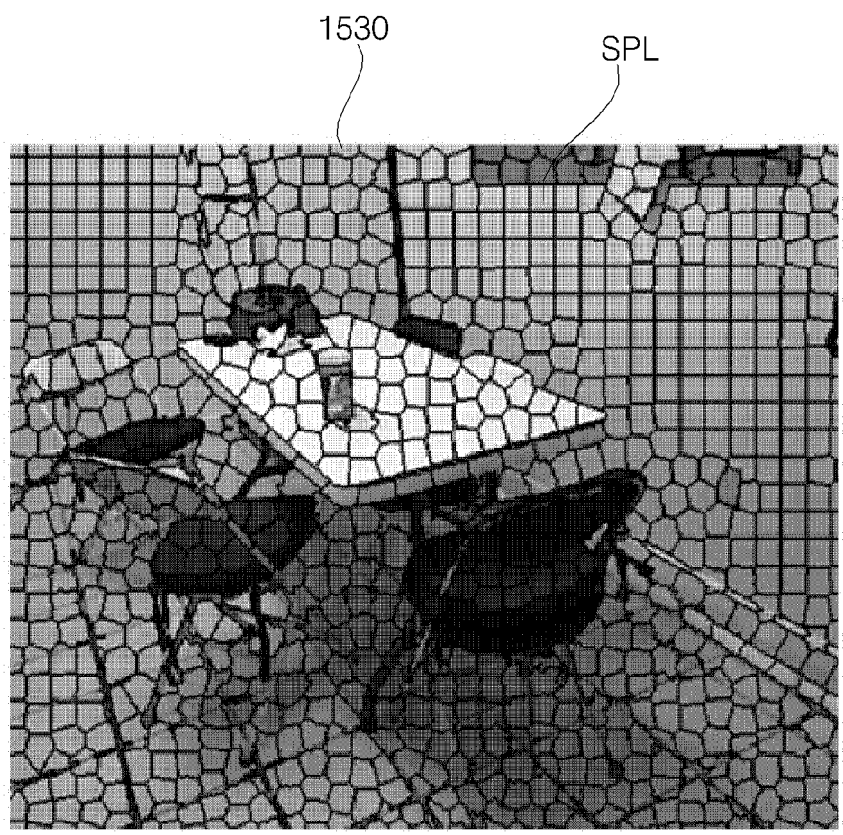

FIG. 15b illustrates grouping of super pixels in an image 1530.

The processor 270 can group super pixels SPL in the image on the basis of the colors or luminances of the image.

The processor 270 may calculate representative values of the super pixels and perform segmentation on the basis of the representative values of the super pixels. Particularly, the processor 270 can perform segmentation using the local CNN technique.

Figure 15C:
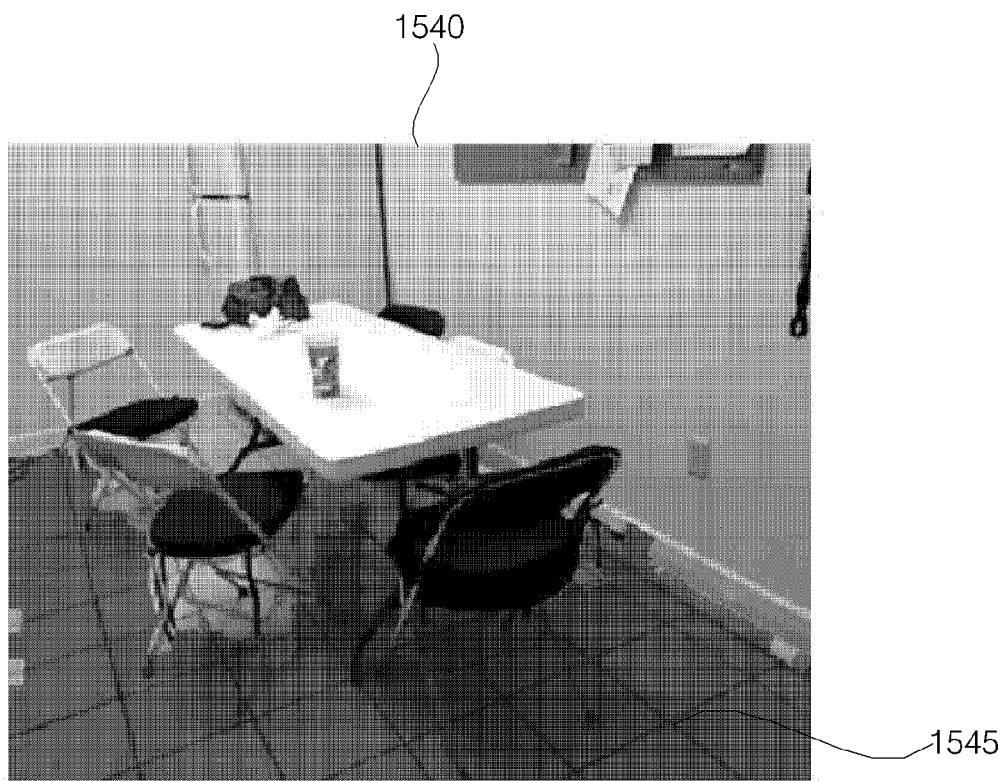

Accordingly, the processor 270 can distinguish a floor area that is an area where the mobile robot 100 can move in the image, as shown in FIG. 15c.

FIG. 15c illustrates a floor area 1545 in an image 1540.

Consequently, the mobile robot 100 can distinguish the area through image processing and move on the floor area 1545 where the mobile robot 100 can move.

Meanwhile, when the local CNN technique instead of FCC technical is used, as described in FIG. 10 to FIG. 15c, segmentation of an image can be performed rapidly and accurately.

However, since a combination of 50 to 100 pixels is set to a super pixel and convolution, pooling and filtering are performed in units of super pixels, the processor 270 may not distinguish a pattern in an image when the pattern is smaller than the size of the super pixel.

For example, when an image 1600 having a net in the form of a mesh is obtained, the processor 270 can detect the net in the image 1600 because the processor 270 performs signal processing in units of pixels in an image 1610 of FIG. 16(a) when the FCN technique of FIG. 8 is used.

When the local CNN technique is used as shown in FIG. 10 to FIG. 15c, the processor 270 performs signal processing in units of super pixel SPL larger than the unit of the net, and thus may not detect the net in the image 1600.

Figure 16:
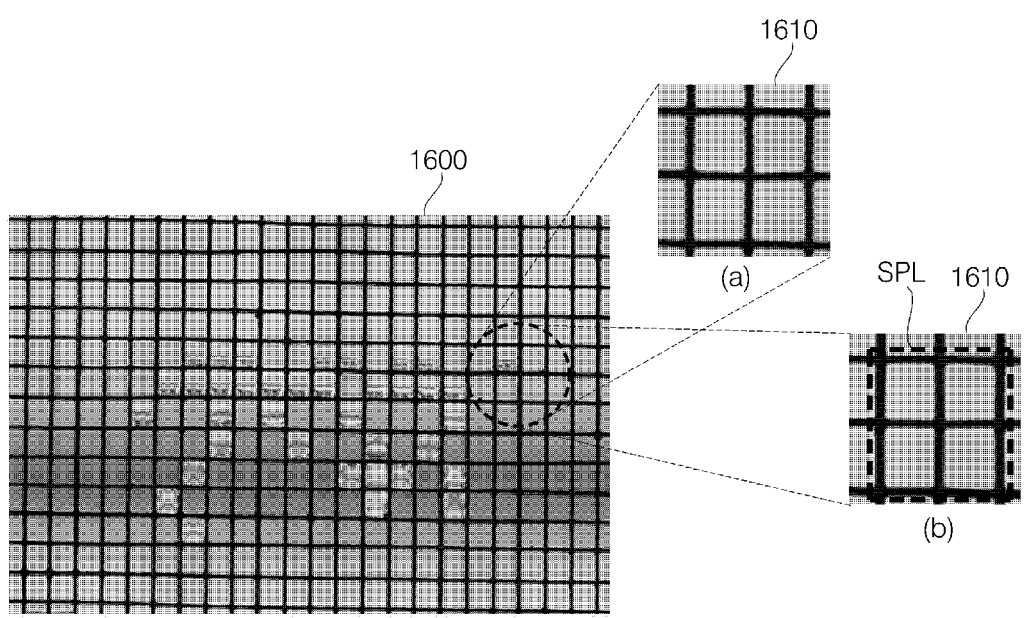

Accordingly, when the mobile robot 100 obtains the image 1600 having a net in the form of a mesh, as shown in FIG. 16, if a pattern in the image is smaller than the size of the super pixel, the pattern is not distinguished and the main body 260 can be controlled to move to the pattern.

The operating method of the mobile robot of the present invention can be implemented with processor-readable code in a processor-readable recording medium included in the mobile robot. The processor-readable recording medium may include all kinds of recording devices capable of storing data readable by the processor. Examples of the processor-readable recording medium may include a ROM, a RAM, a CD-ROM, a magnetic tape, a floppy disk, an optical data storage device, and the like and also include carrier-wave type implementation such as transmission over the Internet. Further, the processor-readable recording medium may be distributed to a computer system connected to a network such that processor-readable code can be stored and executed in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An image processing apparatus comprising:
an image sensor for obtaining an image; and
a processor for performing signal processing on the image from the image sensor,
wherein the processor is configured to:
group super pixels in the image on the basis of colors or luminances of the image;
calculate representative values of the super pixels; and
perform segmentation on the basis of the representative values of the super pixels, wherein the processor is configured to, when a first image including a net in the form of a mesh is obtained, perform signal processing in a first super-pixel unit larger than a unit of the net in the first image by using a local convolutional neural network, and not detect the net in the first image based on the first super-pixel unit while detecting an object of the first image, and wherein the net in the first image is detected based on a fully convolutional network during detecting object of the first image.

2. The image processing apparatus according to claim 1, wherein the processor extracts an area in which movement can be performed through the segmentation.

3. The image processing apparatus according to claim 1, wherein the processor separates an object in the image through the segmentation.

4. The image processing apparatus according to claim 1, wherein the processor groups super pixels in the image on the basis of the colors of the image such that the super pixels in the image have different sizes.

5. The image processing apparatus according to claim 1, wherein the processor groups super pixels in the image on the basis of the luminances of the image such that the super pixels in the image have different sizes.

6. The image processing apparatus according to claim 1, wherein the processor performs convolution, pooling and filtering using the representative values of the super pixels.

7. The image processing apparatus according to claim 1, wherein the image is an RGBD image or an RGB image.

8. The image processing apparatus according to claim 1, wherein the processor controls the segmentation such that the segmentation is performed for a plurality of channels.

9. The image processing apparatus according to claim 8, wherein the plurality of channels includes a channel with respect to 2D coordinates of the image, a channel with respect to the luminances and colors of the image, a channel with respect to a depth of the image, a channel with respect to a normal vector of the image, and a channel with respect to 3D coordinates of the image.

10. The image processing apparatus according to claim 8, wherein the processor distinguishes regions in the image on the basis of level values of the plurality of channels.

11. The image processing apparatus according to claim 8, wherein the processor allocates weights to the plurality of channels and distinguishes regions in the image on the basis of the allocated weights and the level values of the plurality of channels.

12. The image processing apparatus according to claim 8, wherein the processor performs network calculation on the basis of the representative values of the super pixels and performs semantic segmentation according to a plurality of channels.

13. The image processing apparatus according to claim 1, wherein the processor performs semantic segmentation based on deep learning.

14. The image processing apparatus according to claim 1, wherein, when a pattern in the image is smaller than the sizes of the super pixels, the processor does not distinguish the pattern.

15. A mobile robot comprising:
a main body;
a driver for moving the main body; and
the image processing apparatus according to claim 1.

16. The mobile robot according to claim 15, wherein, when a pattern in the image is smaller than the sizes of the super pixels, the processor does not distinguish the pattern and controls the main body such that the main body moves to the pattern.

* * * * *